United States Patent [19]
Burnod et al.

[11] Patent Number: 5,533,169
[45] Date of Patent: Jul. 2, 1996

[54] NEURAL NETWORK SYSTEM HAVING DYNAMICALLY RECONFIGURABLE CONNECTIONS

[75] Inventors: Yves Burnod, Arcueil; Pascal Leray, St Gilles, both of France

[73] Assignees: France Telecom; Telediffusion De France-TDF(SA), both of Paris, France

[21] Appl. No.: 235,302

[22] Filed: Apr. 29, 1994

[30] Foreign Application Priority Data

Apr. 29, 1993 [FR] France .................................. 93 05266

[51] Int. Cl.⁶ ........................ G06F 15/16; G06F 15/180; G06E 1/00
[52] U.S. Cl. ................. 395/27; 395/11; 395/23; 395/24
[58] Field of Search ................................ 395/27, 24, 11, 395/23

[56] References Cited

U.S. PATENT DOCUMENTS

| | | | |
|---|---|---|---|
| 4,858,177 | 8/1989 | Smith | 364/900 |
| 4,974,169 | 11/1990 | Engel | 364/513 |
| 5,033,006 | 7/1991 | Ishizuka et al. | 364/513 |
| 5,093,900 | 3/1992 | Graf | 395/24 |
| 5,129,039 | 7/1992 | Hiraiwa | 395/24 |
| 5,155,802 | 10/1992 | Mueller et al. | 395/24 |
| 5,204,938 | 4/1993 | Skapura et al. | 395/27 |
| 5,218,245 | 6/1993 | Kohler et al. | 307/465 |
| 5,371,834 | 12/1994 | Tawel | 395/23 |

OTHER PUBLICATIONS

Philip Treleaven & Paulo V. Rocha; Towards a General-purpose Neurocomputing System; May 13, 1991; pp. 331–335; FIGS. 5, 6.

Edward Wojciechowski; Snap: A Parallel Processor for Implementing Real Time Neural Networks; May 20, 1991; pp. 736–742.

Lance B. Jump: A Massively Parallel, Multiple-SIMD Architecture for Implementing Artificial Neural Networks; pp. 13–18.

*Primary Examiner*—Raymond J. Bayerl
*Assistant Examiner*—A. Katbab
*Attorney, Agent, or Firm*—Kerkam, Stowell, Kondracki & Clarke; Wiliam L. Feeney

[57] ABSTRACT

A neural network system is provided that includes a network of neural operators pilot controlled by a control unit. The activities calculated by the operators are memorized in associated memory spaces that are addressable by an activity address. To facilitate reconfiguring the network, the memory space of at least one portion of the operators contains the activity addresses of other operators of the network. Hence, the input activities of these operators may be issued from any other operators in a way that is modifiable by simply changing the values of the activity addresses. The invention is particularly suited to image and sound analysis and synthesis.

14 Claims, 7 Drawing Sheets

NEURAL NETWORK SYSTEM HAVING DYNAMICALLY RECONFIGURABLE CONNECTIONS

FIELD OF THE INVENTION

The invention relates to a system for processing signals using a network of neural operators.

BACKGROUND OF THE INVENTION

Such systems are finding increasing application in the entire field of information processing. They are especially highly suitable for solving problems that conventional information processing is poorly suited to solving. Examples of fields to which such systems apply that can be named are robotics, automatic pilot control, molecular research, automatic numbering of objects, and analysis and synthesis of sound.

One particularly promising field to which this type of system applies is image processing: analyzing images to recognize forms or objects, coding and decoding of images with a view to performing image compression, for example for a television system.

In the wake of numerous mathematical models, some cabled embodiments of neural networks have appeared that are arranged to be adapted to various applications. One example that can be cited is the "perceptron", which is made up of a set of processing units, called neural operators, disposed in a plurality of interconnected layers. The data to be processed are applied to the input of the first layer, and processing is done through the successive layers; the result is displayed at the output of the operators in the last layer.

The function achieved by such a network is determined by the weight of interconnections connecting the outputs of the neural operators of one layer to the inputs of those of the next layer. These weights, called "synaptic weights" by analogy with biology, can be modified by a training mechanism defined by an algorithm. This example follows the rule called HEBB, for example, and the training can be supervised or unsupervised. Another rule of training that may be mentioned is "retrograde propagation" or "gradient retropropagation".

The neural operators may be of the analog or digital type and perform relatively simple operations. Hence the analog or digital operators are intended to perform multilinear functions, that is, sums of products and possibly thresholding operations. For binary operators, the functions return to simple logic operations. Considering all the input signals of an operator and all of its synaptic weights to be a vector of input activities and a vector of coefficients, the basic operation is reduced for example to a scalar product of these two vectors. The output signal furnished by the operator defines its activity, which may be interpreted as a measure of the agreement of the signals received with a reference state defined before training by the coefficient vector.

In the context of a physical embodiment based on electronic components, it is clear that the number of input connections of one operator is necessarily limited. The result is a limitation in the number of operators capable of influencing some other given operator. In the networks known thus far, the possible interconnections among operators are predefined as a function of the application involved. The result is a lack of flexibility in configuring the network both upon initialization and in the course of its operation.

OBJECT AND SUMMARY OF THE INVENTION

The object of the invention is to overcome this disadvantage by proposing a system that enables dynamic reconfiguration of the connections among the operators of the network.

More precisely, the subject of the invention is a signal processing system including a network of neural operators pilot controlled by a control unit, each neural operator being conceived to perform a multilinear function bearing on at least one input vector made up of a plurality of input variables, the function defining an activity of the operator, the input variables being representative of input signals of the system or of activities of other operators of the network, this system being characterized in that it includes memorization means that are addressable by the control unit and are organized into a plurality of memory spaces respectively associated with the operators, each memory space containing, at a given address called the activity address, a value representative of the activity of the associated operator and that, for at least one subset of the operators of the network, the associated memory spaces likewise contain the addresses of the activities that make up the input vectors of the operators of the subset.

Because of the aforementioned addressing mechanism, this arrangement accordingly makes it possible to modify the interconnections among operators, both upon initialization of the system to adapt it to various applications and in the course of processing to dynamically modify the configuration of the system. This modification can be done by simply changing the values of the activity addresses.

To facilitate the addressing operations and to enable parallel operations, in another characteristic the invention provides that the network is organized into a plurality of levels, each level including a group of operators, at least one memory module assigned to the memory spaces of the operators of the group, and at least one first communications bus connecting the operators to the memory module, and that the network includes links enabling communications between the control unit and each of the first communications buses.

Also to increase parallelism and in another feature of the invention, each level includes addressing means that are capable of addressing the activities of the operators of the other levels after reading of the activity addresses contained in the memory module of the level.

In a particular aspect of embodiment, the multilinear function is the scalar product of the input vector and either a coefficient vector associated with the operator, or another input vector.

One important property of neural networks is that they can perform different processing operations on the same input signals and can establish correlations among these different processing operations. To benefit from this capability, the invention further provides that the operators of the subset and belonging to the same level are connected to one another. In addition, each of the operators provided to perform the scalar product of an input vector and a coefficient vector includes training means for correcting the coefficient vector as a function of its input vector and of the activities of the other operators of the same level.

Further aspects and details of embodiment of the system of the invention will become apparent from the ensuing description.

The system that has just been defined may find numerous applications, in particular for performing image processing.

Hence the invention also relates to an image analysis system using this system.

In this application, the input signals of the system are signal representing an image that are applied to the input of the operators of the first level, the operators of the second level being associated with memory spaces containing the activity addresses of operators of the first level. In addition, the control unit activates the various levels successively in increasing order of the levels, the training means being activated in the course of a training process preceding an analysis whose result can be represented by the values of the coefficients of the operators of any of the levels higher than 1.

As will be seen in detail hereinafter, the relative addressing of the input activities of an operator associated with the organization in a plurality of levels of the network makes it possible to perform analysis operations of moving images with a view to identifying homogeneous forms, and objects, regardless of their positions and their relative motions.

This image analysis system can advantageously be used during a training phase with a view to making an image synthesis system. The same system can also integrate a system of analysis and synthesis of the sound associated with the images.

The aspects of interest regarding the application of the system to image processing will be explained in further detail in the ensuing description, in conjunction with the drawings.

DESCRIPTION OF THE PREFERRED EMBODIMENTS

Figure 1:
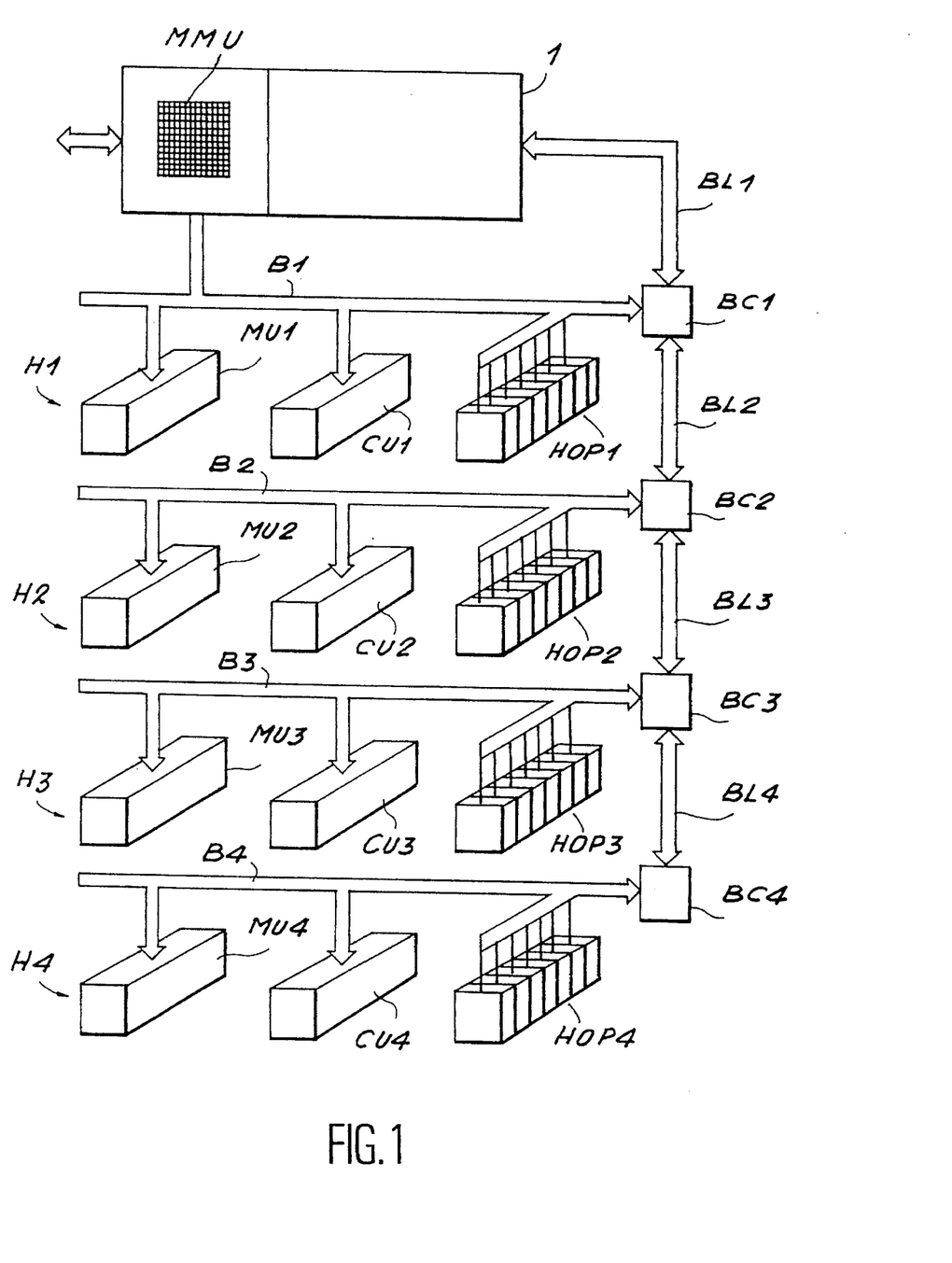
FIG. 1 shows all of a particular embodiment of the system according to the invention.

The system shown by way of example in FIG. 1 is made up of a network of neural operators H1–H4 cooperating with a control unit 1 acting as a supervisor. Both this unit 1 and the first level HI of the network communicate with a memory MMU in which the signals to be processed, such as the pixels in an image, are memorized. Each level H1–H4 is organized around a bus B1–B4 and includes a set of operators HOP1–HOP4, a memory module MU1–MU4, and a control circuit CU1–CU4, which are each connected to the buses B1–B4 of the corresponding level.

The buses B1–B4 may be put into communication with one another and with the control unit 1 by way of links BL1–BL4 and bus controllers BC1–BC4.

This organization accordingly achieves a distribution of the processing memory by levels, which enables delocalization of certain operations involving memory accesses for each level in question.

Considering the structure that has been chosen, the network is controlled in such a way as to successively activate the operators of the different levels in increasing order of the levels, and for an active level, activating the various operators of this level in a given order successively.

It is understood that the invention may be implemented by other structures using other systems for physical interconnection among the operators, in particular those that would enable asynchronous parallel operation of at least some of the operators of the network.

More precise explanation as to the function of the system will be given in conjunction with FIGS. 3 and 4, in particular. Beforehand, the conventional notations that will be used hereinafter should be mentioned. To do so, we can turn to FIG. 2, which schematically shows the organization of the operators of the network.

Figure 2:
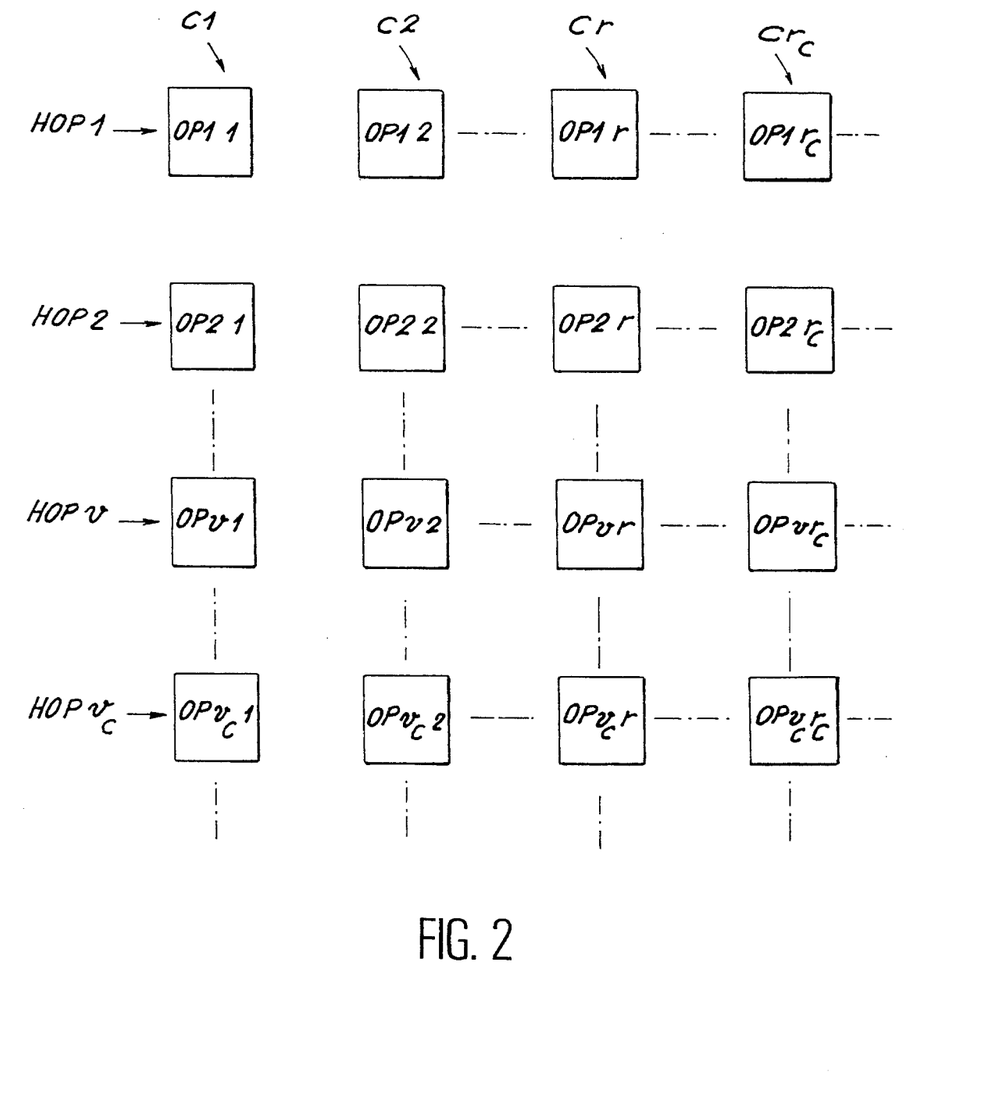
FIG. 2 is a schematic illustration of the organization of the operators of the network of the invention.

By this convention, each level is identified by a postscript v, and a particular level being considered is identified by the postscript $v_c$. Similarly, the various operators of the same level are identified by a layer postscript r and the layer of a particular operator is identified by the postscript $r_c$. Hence an operator belonging to level v and layer r will be identified by reference symbol OPvr, and a particular operator in question will be identified by the reference symbol $OPv_cr_c$, and any operator of a particular level $v_c$ will be identified by the symbol $OPv_cr$.

Figure 3:
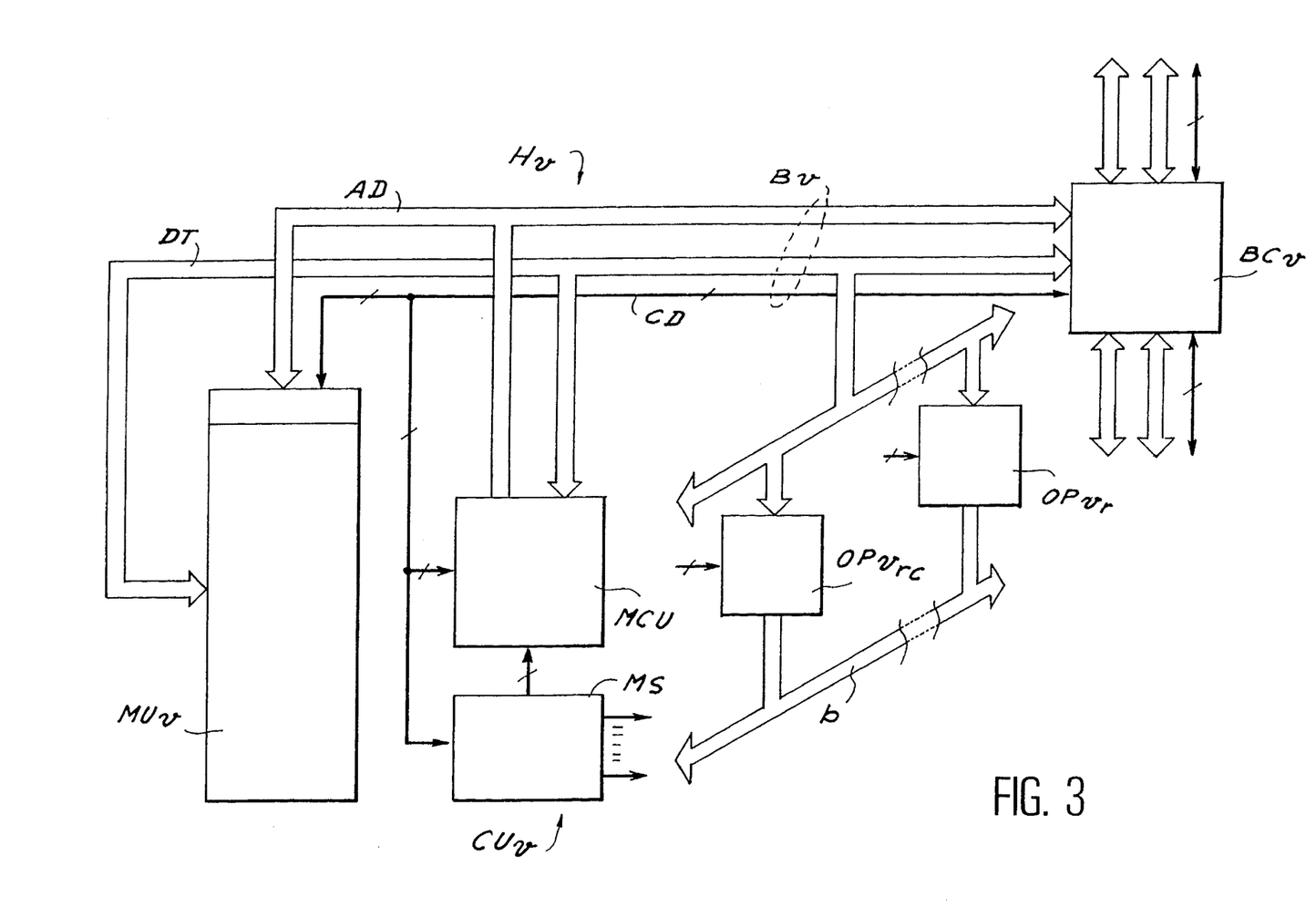
FIG. 3 shows one embodiment of a level of the network according to the invention.
Figure 4:
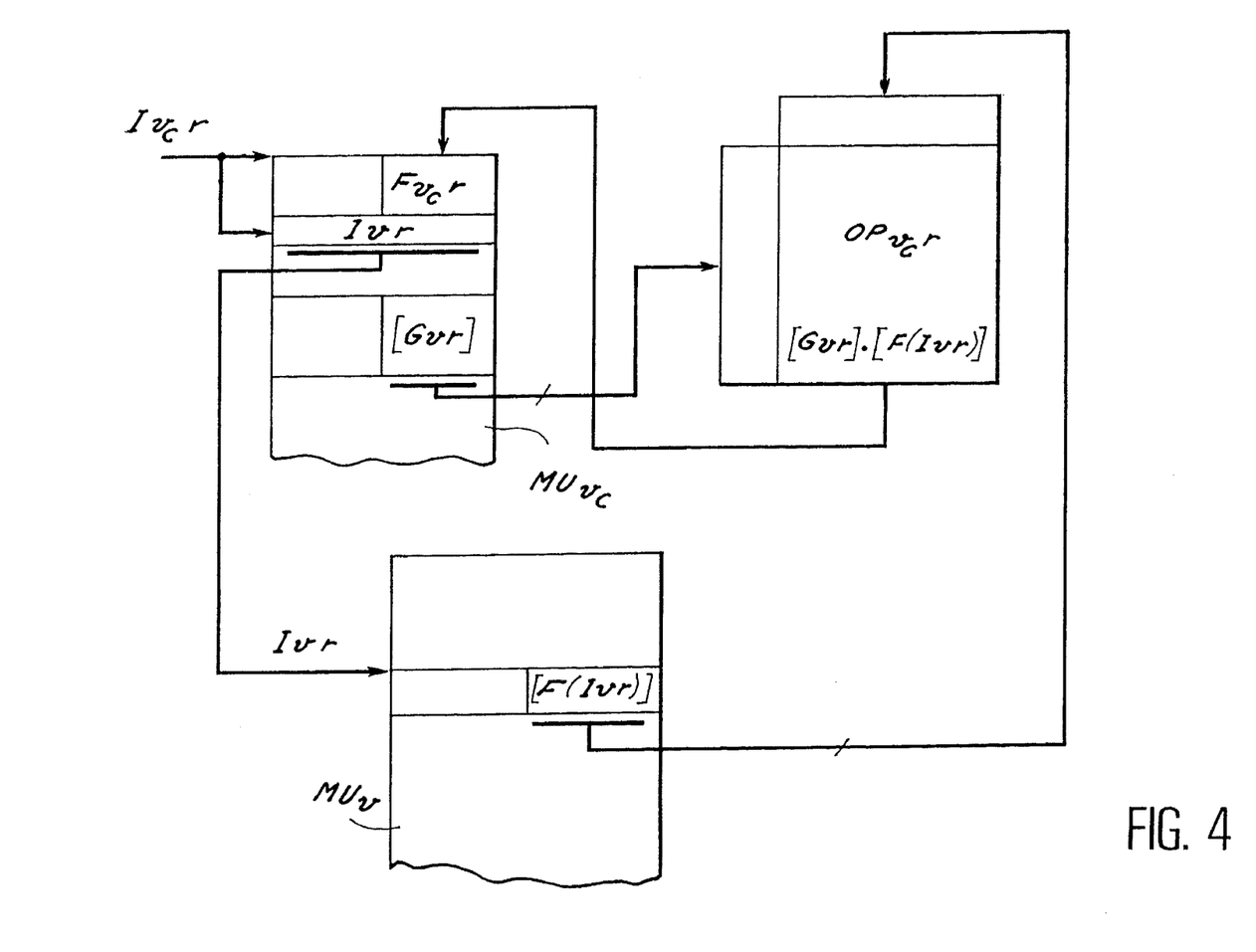
FIG. 4 is a diagram explaining the addressing mechanism in the invention.

FIG. 3 shows an exemplary embodiment of the constituent element of one of the levels Hv of the network. Once again, we find the bus Bv, made up of data lines DT, address lines AD, and command lines CD, enabling communication of the units of this level with those of other levels and with the control unit 1. The operators $OPvr_c, \ldots, OPvr$ are each connected to the data lines DT. They are also connected to one another via a second link b, which may also be a communications bus. The control circuit CUv is essentially made up of a memory controller MCU and a sequencer MS, which advantageously is microprogrammable. The sequencer MS receives initialization and control signals, such as clock signals, by way of the control lines CD, and in turn furnishes the signals that control the memory controller MCU and the operators OPvr. The memory controller MCU is connected at the input to the data lines DT and at the output to the address lines AD. It is also connected to the command lines CD, in order to transmit the signals for commanding reading or writing and to exchange request and acknowledgement signals with the bus controller BCV during addressing operations.

Because of this arrangement, the memory controller is capable of addressing a memory module of the same level or of a different level. It can also read an address in the associated memory module level MUv and place it at the address lines AD in order to access the data contained in the memory modules of other levels.

This embodiment makes it possible to use an indirection mechanism that is essential to the invention. This mechanism is explained schematically in conjunction with FIG. 4. In FIG. 4, we refer to the operator $OPv_cr$ of the level $v_c$ and the layer r. This operator is associated with a memory space of the module $MUv_c$, which in particular contains a coefficient vector [Gvr], an address Ivr, and the most recent value calculated for the activity Fvr of the operator. The address Ivr defines a memory location in a memory module of a different level, such as v, containing an activities vector [F(Ivr)], each component of which is an operator activity value of level v and layer r.

Hence according to the invention, calculating the output activity of the operator $OPv_cr$ is done first by addressing the module $MUv_c$ in order to look for the address Ivr. This address enables access to the activities vector [F(Ivr)], which results from calculations made by the operators of level v. This activities vector and the coefficient vector [Gvr], are then applied to the inputs of the operator $OPv_c r$. The operator then finds the scalar product of these two vectors, and the result obtained, $Fv_c r$, is finally loaded into the module $MUv_c$.

One can verify that these operations can be executed by the means described in conjunction with FIG. 3, naturally with the provision of suitable sequencing of the commands.

Figure 5:
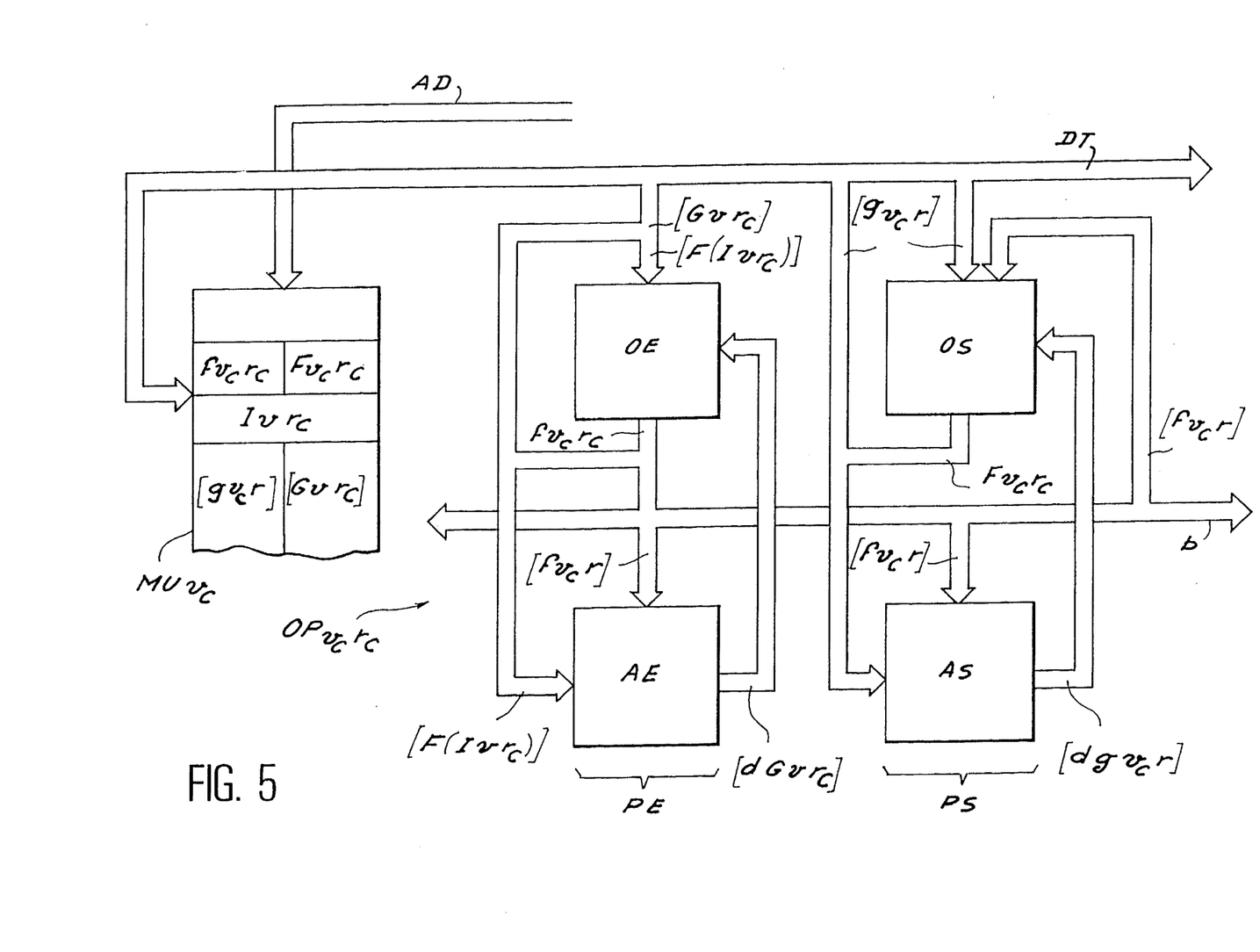
FIG. 5 is a functional illustration of an operator of the network.

FIG. 5 is a functional diagram of an operator provided with training means and capable of communicating via the bus b with the other operators of the same level. To make the explanation easier, we assume that this involves the operator $OPv_c r_c$ of level $v_c$ and layer $r_c$. The operator is made up of an input processor PE and an output processor PS. The input processor PE is made up of two functional modules, called the input operator OE and the input training module AE, which respectively are assigned to calculate the activity and to perform the function of training by modification of the coefficients. In the same way, the output processor PS is made up of corresponding functional modules: an output operator OS and an output training module AS.

The input operator OE is connected at the input to the data lines DT in such a way as to be capable of loading the coefficient vector $[Gvr_c]$ contained in the module $MUv_c$ and the activity vector $[F(Ivr_c)]$ corresponding to the address $Ivr_c$ contained in the module $MUv_c$. The input operator OE then calculates the activity $fv_c r_c$, and this activity is transmitted to the data lines DT for the sake of loading into the module $MUv_c$. It is transmitted also to the bus b to be taken to the destination of the training module AE and other operators of the same level $v_c$.

The output operator OS of the output processor PS is connected at the input to the data lines DT in such a way as to be capable of loading its coefficient vector $[gv_c r]$. Another of its inputs is connected to the bus b in such a way as to receive a second activity vector $[fv_c r]$ made up of the set of activities of the input operators OE of the same level $v_c$. The activity $Fv_c r_c$ calculated by the output operator OS is transmitted to the data lines DT with a view to loading into the module $MUv_c$ as well as the associated training module AS.

The training module AE of the input processor PE is connected at the input to the bus b in order to receive the second activity vector $[fv_c r]$. It also receives the activity vector $[F(Ivr_c)]$. As a function of these two input vectors, the module AE calculates the correction $[dGvr_c]$ of the coefficient vector $[Gvr_c]$.

The output training module AS receives the coefficient vector $[gv_c r]$ of the output operator OS as well as the second activity vector $[fv_c r]$ and furnishes the correction $[dgv_c r]$ of the coefficient vector $[gv_c r]$.

It should be noted that this representation is purely functional, and that the division of the input and output processors into operators and training modules does not necessarily correspond to physically cutting a circuit in a practical embodiment. Nevertheless, this representation will allow us to explain more simply the detailed function of the operator.

We will recall first that activation of a given level $v_c$ consists of successively activating each of the operators $OPv_c r$ of the level, in a predetermined order. When the operator $OPv_c r_c$ is activated, the memory controller MCU places the first activity vector $[F(Ivr_c)]$ at the input of the active input operator OE. The coefficient vector $[Gvr_c]$ is assumed to be preloaded, and so the operator OE calculates the activity $fv_c r_c$, which is the corresponding component of the second activity vector $[fv_c]$, and transmits it to the bus b. The output operators and the training modules of each of the operators of the level load this value. When all the input operators of the level have thus been successively activated, the second activity vector $[fv_c r]$ is fully defined, and the output operators of the operators of the level $v_c$ calculate the activities $Fv_c r$, and then the training modules AS calculate the correction values $[dgv_c r]$ of the coefficient vectors of the associated output operators.

By way of illustration, we can indicate two examples of training rules that are applicable to the input and output processors, respectively. For the input processor PE, training consists of causing a correction of the coefficient vector $[Gvr_c]$ when the activity $Fv_c r$ of at least one output processor PS of the same level exceeds a predetermined threshold. The correction is then proportional to the activity vector $[F(Ivr_c)]$. The training of the output processor consists, for each activity component $fv_c r$ of the second activity vector $[fv_c r]$, of defining one component of the coefficient vector as the conditional probability that the activity component $fv_c r$ and the activity $Fv_c r_c$ of the output processor will each simultaneously exceed a predetermined threshold. Naturally, other training rules may be chosen depending on the application, in particular in order to adjust the type of correlation desired among the operators of the same level.

Figure 6:
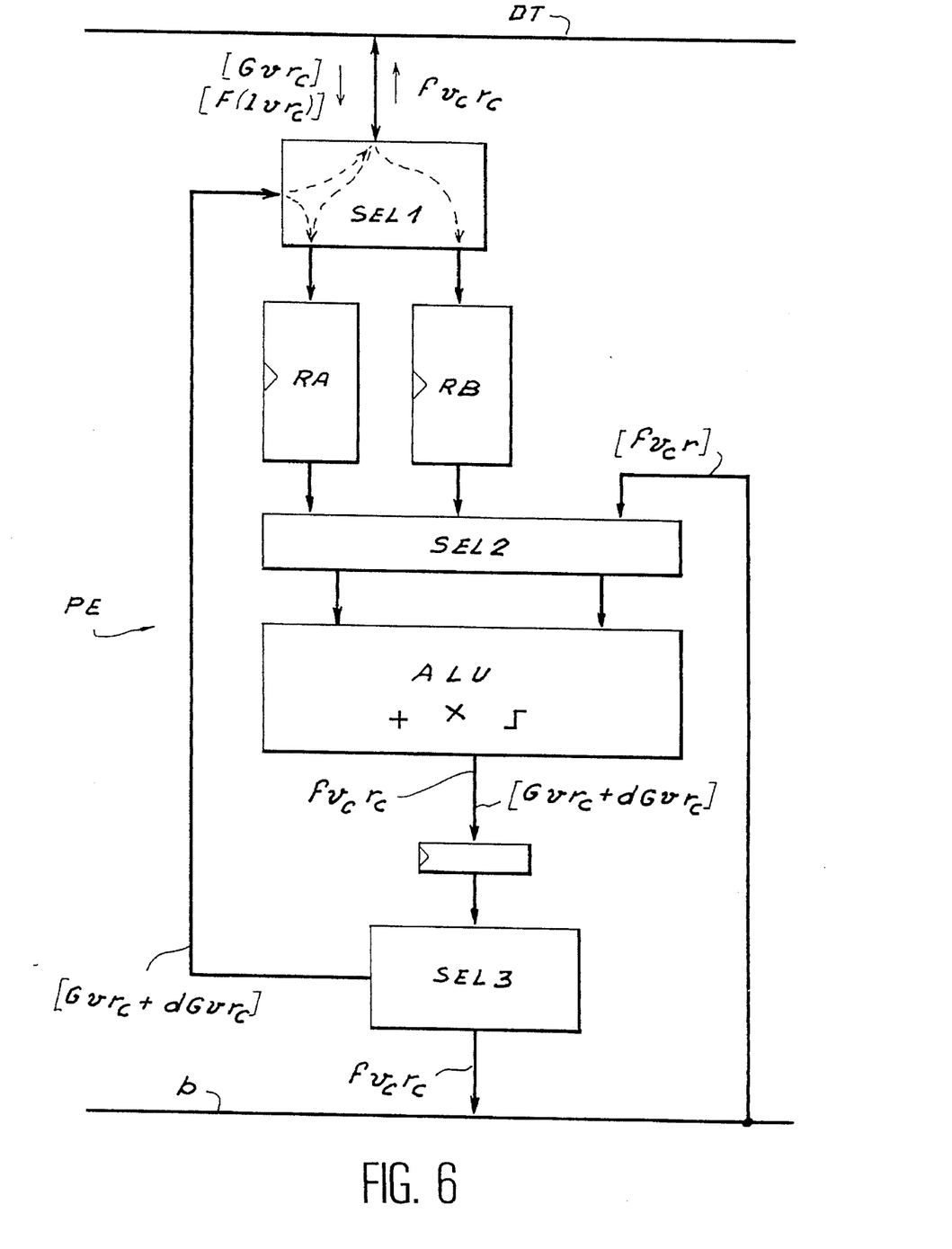
FIGS. 6 and 7 show embodiments of input and output processors making up an operator of the network.
Figure 7:
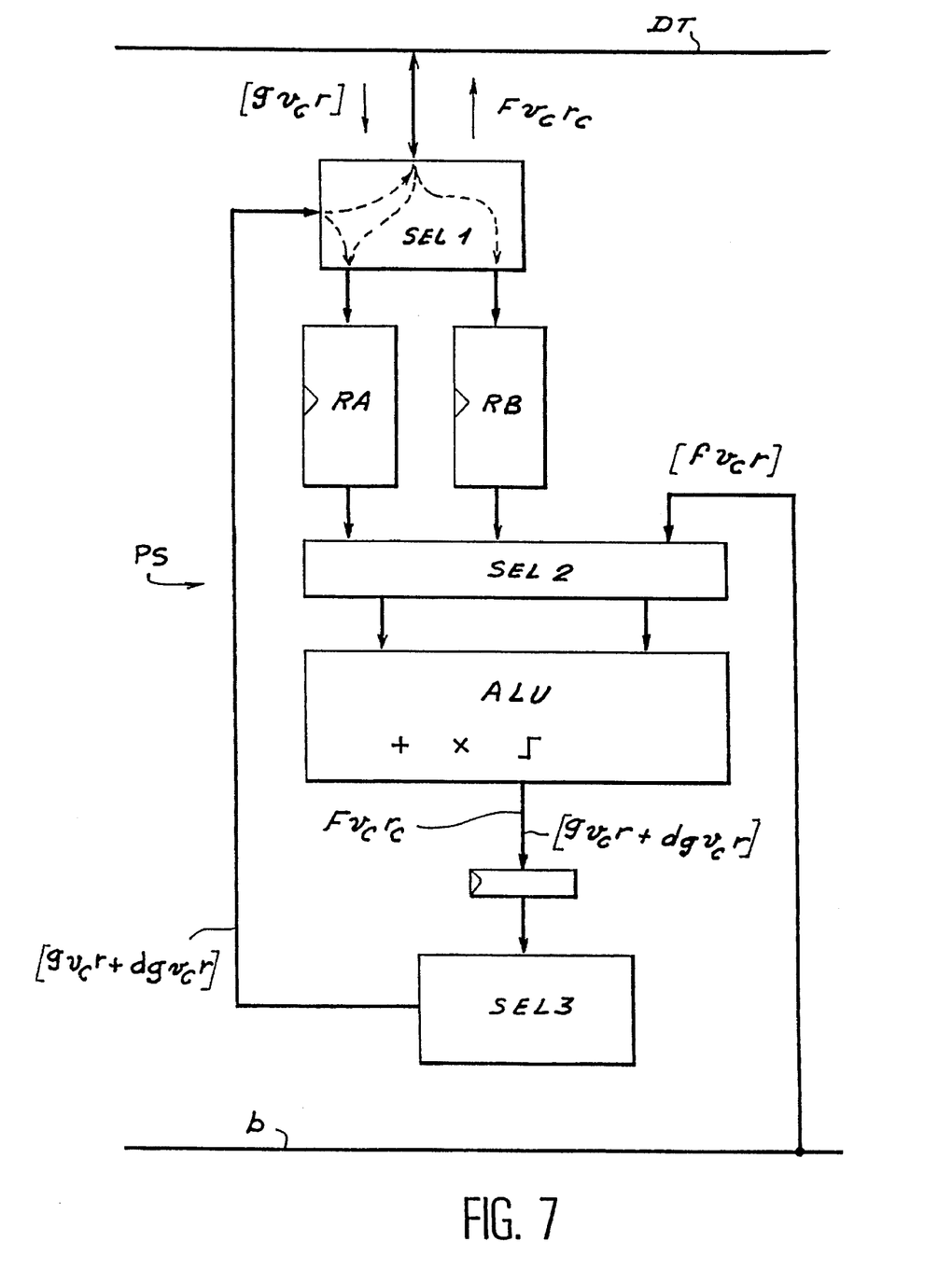

FIGS. 6 and 7 respectively show the input and output processors embodied by means of microprogrammable circuits which integrate the functions of activity calculation and training. These circuits are commanded respectively by modules with specific microprograms that can be executed by the microsequencer MS.

The circuit of FIG. 6 more precisely shows the route of data in an input processor PE. A first bidirectional selector SEL1 is connected to the data lines DT. The outputs of the selectors SEL1 are connected respectively to two banks of registers RA and RB, whose outputs are connected to a second selector SEL2. The two outputs of the second selector SEL2 are applied to the input of an arithmetic and logic unit ALU, whose output is connected to a third selector SEL3 by way of a register. The selector SEL3 has a first output connected to the bus b and a second output connected to a second input of the first selector SEL1. A third input of the second selector SEL2 is connected to the bus b.

The arithmetic and logic unit ALU is provided with conventional operators for addition, multiplication, shifting and thresholding, in such a way as to make it possible to perform the calculation of activities and modifications of the coefficients. One can easily verify that the structure shown enables the circuit to perform the operations of activity calculation and updating of the coefficients by simple, appropriate sequencing of the commands applied to the selectors, the register banks, and the arithmetic and logic unit. To facilitate the verification, the various signals taken into account by the input processor have been shown in relation with the links where these signals appear.

The output processor shown in FIG. 7 is made up of the same elements. The only differences from the input processor are the absence of a link between the third selector SEL3 and the bus b and the signals involved. As above, appropriate sequencing of the components of the processor makes it possible to perform the functions of activity calculation and coefficient calculation.

We will now explain in detail how the system that has just been described can be used and optionally adapted to image processing. The first processing to be considered is naturally that of image analysis intended to furnish synthetic or even abstract information as a function of the pixels making up the image to be analyzed. Another processing is the complementary of the first, that is, synthesis of an image done from synthetic information of the same nature as that processed by the analysis. Finally, with an analysis system and a synthesis system as the basis, it is possible to make an image coding and decoding system that can advantageously apply to a transmission system that has a high degree of compression.

Turning once again to FIG. 1, the main memory MMU will be used to memorize all of the pixels of the image that has been suitably cut into sections. The operators HOP1 of the first level H1 are then arranged to perform the first processing operations of the image signals. In the case where the system is to perform coding with a view to resynthesizing the original image for viewing by the human eye, it is appropriate to choose predefined filters adapted to human vision as the operators of the first level. Advantageously, these filters will be chosen so as to simulate the biological filters of the human visual system, such as those which have been made the subject of numerous studies and publications.

As an example, the article "The Laplacian Pyramid as a Compact Image Code" by Peter J. Burt et al (IEEE Transactions on Communications, Vol. Com-31, No. 4, April 1983, pp. 532–540) describes the use of gaussian and laplacian functions in accordance with a multi-scale organization making it possible to code an image by reinforcing contours and luminous zones. The article entitled "Representation issues and local filter models of two-dimensional spatial visual encoding" by J. G. Daugman (Models of the Visual Cortex, D. Rose and V. G. Dobson, 1985, John Wiley and Sons, Ltd., pp. 096–107) describes the use of generalized two-dimensional gabor filters making it possible to reinforce image zones in priority directions. Finally, the article "Spatiotemporal Mechanisms in Receptive Fields of Visual Cortical Simple Cells: A Model", by Florention W örgötter and Gary Holt (Journal of Neurophysiology, Vol. 65, No. 3, Mar. 1991, pp. 1–16) describes spatiotemporal filters making it possible to reinforce the portions of the image that have sudden variations over time and to which the human eye is particularly attracted.

Analysis of the first level may naturally be supplemented by other families of filters, such as those sensitive to color, texture, curvatures, etc.

Without going into the details that are explained in the aforementioned references, one may recall that multiscale filters first perform spatial, and optionally temporal, convolutions of a generatrix function of the filter (gaussian, laplacian) by the pixels belonging to a subset of the image. This convolution applies in parallel to the entirety of the subsets making up the image. The results obtained form what can be called "hyperpixels", which constitute a condensed representation of the initial image. This representation can be interpreted as an image on a reduced scale. The hyperpixels thus obtained are again regrouped into subsets, and each subset undergoes a new convolution by the generatrix function, in such a way as to define a new set of hyperpixels corresponding to a new representation of the image reduced to a second scale. These operations can be repeated as many times as necessary, in order that the number of hyperpixels of the final scale will be suitably reduced to enable processing by the second level. By applying this method to each of the generatrix functions of the various types of filters, one obtains a plurality of condensed, complementary representations of the original image, and it is these various representations that will define the various layers of operators of the first level.

Hence each layer performs a decomposition of the initial image in accordance with a functional base, enabling reconstruction by a succession of cumulative totals, as described in the first article cited above.

When the system performs an analysis of an image, each layer furnishes at its output a set of activities whose dimension is a function of the number of pixels of the image and of the ratio and number of scales used in the filters of the first level. With a view to performing regroupings of the image by homogeneous zone, the control unit periodically performs regroupings by classes corresponding to adjacent ranges of activity values. Each class is associated with a representative value of the activities belonging to that class, for example by finding the mean of the activities of the class. These representative values are then arranged in decreasing order of their values and then memorized in the memory space associated with the operator at an address, which is the activity address of the operator of the second level of the same layer. The same operation is performed for each of the layers of the first level.

Since each operator of the second level always receives its input activities as a function of the activity address defined above, the function of the second level is made virtually stable in terms of displacements of the homogeneous zones of the image. It is understood that this stability will be preserved as long as the same zones are located within the successive images presented to the input of the system.

Assuming that the above condition is observed, the values of the coefficients of the second level operators will stabilize. These coefficients will each be representative of a corresponding homogeneous zone. One such mechanism must be used during training phases before the synthesis operations are performed.

It may be noted that training of the coefficients is improved because of the correlation among the activities of the various layers, that is, because of the use of input and output operators that enable this correlation.

The application of the system to performing recognition of shapes will then consist of presenting images containing the forms one wishes to be able to recognize to the input of the system, and memorizing the various profiles of the coefficient vectors of the operators corresponding to these various shapes in the control unit. In the control unit, each profile could then be associated with codes that enable identification and enable letting the user know the shapes recognized by the system.

Using the system as an image synthesizer consists of taking as the representative value of a class of activities, particular values corresponding to the values that the coefficients assume when the zones to be synthesized are contained in the images used for the training.

The system can also be used to perform coding of images by associating the analysis and synthesis functions that the system makes possible. This association will in fact make it possible to verify, at each analysis level, the conformity of the synthesis and hence to determine the level up to which the synthesis is satisfactory.

The above coding system will then make it possible to achieve a transmission system with a high degree of compression, by providing an analysis and synthesis system at the level of the transmitter and a synthesis system at the level of the receiver. The effect of the training phase of the analysis system would be to fix the coefficient values of the operators and these values will be transmitted to the synthesis system. In normal operation, the transmitter functions as an analyzer and transmits to the receiver the activity values corresponding to the analyzed images. The activity values transmitted will as priority be those of higher-level operators, and then, depending on the quality sought, those of lower levels. At the level of the receiver, the activity received from an operator of a given layer will make it possible to reconstitute the activities of the operators of lower levels, by taking as an activity the coefficient values of the operators whose associated received activity is strong.

For the sake of simplicity, the above explanations concern only the first two levels, but the principle of operation can easily be extrapolated generally to higher levels. Hence the third level will make it possible to code objects, and the fourth level will make it possible to code object prototypes.

From the standpoint of an application for a television system, which requires analysis, transmission and image and sound synthesis all at once, the same system can be used, by providing layers of specialized operators in the sound analysis and synthesis.

What is claimed is:

1. A signal processing system, including a network of neural operators pilot controlled by a control unit, each neural operator being operable to perform a multilinear function bearing on at least one input vector made up of a plurality of input variables, said function defining an activity of said operator, said input variables being representative of at least one of input signals of the system and of activities of other operators of the network, said system comprising:

memorization means being addressable by said control unit and organized into a plurality of memory spaces respectively associated with said operators, each memory space containing, at an activity address, an activity value provided by the operator associated with the memory space, and, for at least one subset of the operators of the network, said associated memory spaces containing values of addresses of the variables that make up the input vectors of the operators of said subset, said values of addresses being modifiable by said control unit to enable dynamic reconfiguration of interconnections between said neural operators of said network.

2. The system of claim 1, wherein said network is organized into a plurality of levels, each level including a group of operators, at least one memory module assigned to the memory spaces of the operators of said group, and at least one first communications bus connecting said operators to said memory module, said network including links enabling communications between the control unit and each of said first communications buses.

3. The system of claim 2, wherein each level includes addressing means for addressing the activity values of the operators of other levels after reading of the activity addresses contained in the memory module of said level.

4. The system of claim 2 wherein said multilinear function is a scalar product of said input vector and either a coefficient vector associated with said operator, or another input vector.

5. The system of claim 4, wherein the operators of said subset belonging to the same level are connected to one another, each of said operators being provided to perform the scalar product of an input vector and a coefficient vector, including training means for correcting said coefficient vector as a function of its input vector and the activity values of other operators of the same level.

6. The system of claim 5, wherein the operators of said subset comprise an input processor and an output processor, wherein said input processor is connected at the input to the first communications bus to calculate its activity value, said activity value being defined as the scalar product of a coefficient vector and a first activity vector formed by the output operator activity values of other levels, said input processor transmitting said scalar product to a second communications bus; and said output processor being connected at an input thereof to said second communications bus to calculate its activity value, said activity value being defined as the scalar product of a coefficient vector and a second activity vector formed of the activity values of other input processors of the same level, said output processor transmitting said sum to the first bus.

7. The system of claim 6, wherein training of an input processor comprises causing a correction of its coefficient vector when the activity value of at least one output processor of the same level exceeds a predetermined threshold, said correction being proportional to said first activity vector.

8. The system of claim 7, wherein the training of an output processor comprises, for each activity component of said second activity vector, defining a component of the coefficient vector as a conditional probability that said activity component and the activity value of said output processor will simultaneously each exceed a predetermined threshold.

9. The system of claim 8, wherein said training means comprise training microprograms that control the operation of said input and output processors.

10. The system of claim 5, wherein said input signals of the system are signals representing an image that are applied to the input of the operators of the first level, the operators of the second level being associated with memory spaces containing the activity addresses of operators of the first level, wherein the control unit activates the various levels successively in increasing order of the levels, said training means being activated in the course of a training process preceding an analysis whose result can be represented by the values of the coefficients of the operators of any of the levels higher than 1.

11. The system of claim 10, wherein each level is subdivided into a plurality of layers, each layer being represented by an associated operator, each operator of the first level of a layer is formed of a set of filters of the same type, said filters processing all of the image signals, each filter performing processing of the image signals representing a subset of the image, wherein, for each set of filters of the same layer, the control unit is arranged to periodically perform regrouping by classes of filters, said classes corresponding to adjacent ranges of output values of the filters, each class being associated with a representative value of said output values, said representative values being arranged in decreasing order of their values and then being memorized in the memory space at an address which is the activity address of the operator of the second level of the same layer.

12. The system of claim 11, wherein the filters of different layers are of different types, in order to perform predefined complementary processing operations.

13. The system of claim 12, wherein the different types of filters simulate the biological filters of the human visual system.

14. The system of claim 10, being used during a training phase preceding a synthesis, said synthesis subsequently comprising performing a reconstruction of the images as a function of selected operator coefficient values.

* * * * *